United States Patent [19]

Nakamura et al.

[11] Patent Number: 5,961,704
[45] Date of Patent: Oct. 5, 1999

[54] AQUEOUS MARKING PEN INK COMPOSITION FOR WRITING BOARD

[75] Inventors: Hiroyuki Nakamura, Mie; Hiroyuki Hayashi, Aichi, both of Japan

[73] Assignee: The Pilot Ink Co., Ltd., Aichi, Japan

[21] Appl. No.: 09/025,776

[22] Filed: Feb. 19, 1998

[30] Foreign Application Priority Data

Feb. 19, 1997 [JP] Japan ........................... 9-52490

[51] Int. Cl.⁶ .................................................. C09D 11/16
[52] U.S. Cl. ..................... 106/31.32; 106/31.33; 106/31.37; 106/31.58; 106/31.64; 106/31.65; 106/31.69; 106/31.86; 106/31.88
[58] Field of Search ............... 106/31.32, 31.33, 106/31.37, 31.58, 31.64, 31.65, 31.69, 31.86, 31.88

[56] References Cited

U.S. PATENT DOCUMENTS

| | | | |
|---|---|---|---|
| 5,217,255 | 6/1993 | Lin et al. | 106/31.32 |
| 5,661,197 | 8/1997 | Villiger et al. | 106/31.32 |
| 5,852,073 | 12/1998 | Villiger et al. | 106/31.32 |

FOREIGN PATENT DOCUMENTS

| | | |
|---|---|---|
| 0778325 | 6/1997 | European Pat. Off. . |
| WO9619542 | 6/1996 | WIPO . |

OTHER PUBLICATIONS

Database WPI, Section Ch, Week 8933, Derwent Publications, Ltd., London, GB; Class G02, AN 89–237031, XP002067123 & JP 01 170 672 A (Canon KK), Jul. 5, 1989, Abstract.

Database WPI, Section CH, Week 9025, Derwent Publications Ltd., London, GB; Class A18, AN 90–189778, XP002067124 & JP 02 124 985 A (Kodera M), May 14, 1990, Abstract.

*Primary Examiner*—Helene Klemanski
*Attorney, Agent, or Firm*—Sughrue, Mion, Zinn, Macpeak & Seas, PLLC

[57] ABSTRACT

The present invention provides an aqueous marking pen ink composition for writing board which gives writing that can be easily erased by wiping with a dry erasing material without staining on the surface of the writing board even if the writing is half-dried, not to mention after dried on the surface of the writing board. The novel aqueous marking pen ink composition for writing board comprising as essential components a colorant, a resin, a separating agent and water, wherein the colorant comprises microcapsules containing a coloring substance selected from the group consisting of oil-soluble dye, disperse dye and pigment and oil medium which dissolves or disperses a coloring substance. Writing drawn on the surface of a writing board with the aqueous marking pen ink for writing board according to the present invention can be easily and completely erased by wiping with a dry erasing material regardless of whether it is half-dried shortly after drawn on the writing board or after thoroughly dried.

11 Claims, No Drawings

AQUEOUS MARKING PEN INK COMPOSITION FOR WRITING BOARD

FIELD OF THE INVENTION

The present invention relates to an aqueous marking pen ink composition for writing board, which can provide, on a writing board made of an ink-impermeable surface material, writing that can be easily erased by wiping with a dry erasing material such as soft paper or cloth.

BACKGROUND OF THE INVENTION

As a marking pen ink for writing board, there has heretofore been commonly used a volatile organic solvent-based ink. In recent years, various compositions of aqueous ink have been proposed in the light of odor and safety in use, as disclosed in JP-B-6-4805, JP-B-8-16206 and JP-B-8-32845 (The term "JP-B" as used herein means an "examined Japanese patent publication"). Writing drawn by these prior ink can be fairly erased after completely dried. However, as compared with writing drawn by a volatile organic solvent-based ink, writing drawn by an aqueous ink on a writing board dries slowly and therefore it is often erased in a half-dried condition. In such a case, staining of the entire surface of the writing board with the ink occurs, which tends to cause insufficient erase.

SUMMARY OF THE INVENTION

It is therefore an object of the present invention to provide an aqueous marking pen ink composition for writing board which can provide on a writing board made of an ink-impermeable surface material writing that can be easily and completely erased even if writing is in a half-dried condition by wiping with a dry erasing material such as soft paper or cloth, as well as after completely dried.

The aqueous marking pen ink composition for writing board according to the present invention comprises a colorant, a resin, a separating agent and water, wherein said colorant comprises microcapsules containing a coloring substance selected from the group consisting of an oil-soluble dye, a disperse dye and a pigment, and said microcapsules are dispersed in an aqueous medium.

DETAILED DESCRIPTION OF THE INVENTION

Examples of the foregoing oil-soluble dye or disperse dye include those selected from the group consisting of dyes classified as solvent dyes and disperse dyes on the Color Index, respectively. From the standpoint of chemical structure, it is a dye having an azo, metal complex azo, anthraquinone or metal phthalocyanine structure.

Examples of the foregoing pigment include organic pigments such as azo pigment, anthraquinone pigment, condensed polyazo pigment, thioindigo pigment, metal complex pigment, phthalocyanine pigment, perynone pigment, perylene pigment, dioxazine pigment and quinacridone pigment, and inorganic pigments such as carbon black and iron oxide.

The microcapsules of the present invention may further contain an oil medium which disperses or dissolves said coloring substance inside the microcapsules.

Examples of the foregoing oil medium include those selected from the group consisting of esters such as monobasic ester, dibasic monoester, dibasic diester, partial esterification product of polyvalent alcohol and complete esterification product of polyvalent alcohol, aromatic hydrocarbons such as alkylbenzene and alkylnaphthalene, higher alcohols, ketones and ethers, which may be used singly or in admixture of two or more.

The foregoing microcapsules are colored fine grains obtained by a process which is known as a microcapsulation method, and contain coloring substance dissolved or dispersed in an oil medium inside the shells made of membrane-forming material.

Examples of the foregoing membrane-forming material constituting the shell include gelatin, shellac, gum arabic, rosin, rosin ester, ethyl cellulose, carboxymethylcellulose, paraffin, tristearin, polyvinyl alcohol, polyethylene, polypropylene, acrylic resin, vinyl resin, polyisobutene, polyurethane, polybutadiene, polyester, polyamide, epoxy resin, phenolic resin, silicone resin, polystyrene, melamine resin, etc., which may be used singly or in admixture of two or more.

Examples of the microcapsulation method employable herein include known methods such as the coacervation method, the in situ polymerization method, the interfacial polymerization method, the submerged curing film method, the aqueous solution phase separation method, the organic solvent phase separation method, the melt dispersion cooling method, the air suspension coating method, and the spray drying method.

The foregoing microcapsules to be incorporated in the ink of the present invention are colored fine grains preferably having an average diameter of from 0.1 to 10 $\mu$m (determined by, for example, Dot Analyzer DA-5000S available from Oji Scientific Instruments Co., Ltd.) and are incorporated in the ink composition preferably in an amount of from 2 to 30% by weight based on the total weight of the ink composition.

The aqueous medium of the ink composition according to the present invention comprises water, the resin, and the separating agent, and optionally may further include other auxiliary additives such as surface active agents, lower alcohols, and the like.

Examples of the resin which constitutes the aqueous medium include those selected from the group consisting of partially saponified polyvinyl acetates, polyvinyl acetals, polyvinyl alcohols, vinyl acetate/vinyl alcohol/acrylic acid ester copolymers, vinyl acetate/vinyl alcohol/methacrylic acid ester copolymers, and cellulose resins and the resin is incorporated in the ink composition preferably in an amount of from 0.1 to 15% by weight based on the total weight of the ink composition.

The separating agent is a component which properly prevents the ink from being firmly fixed to the surface of a writing board so that writing thus made can be easily erased by wiping with a dry erasing material. Examples of the separating agent include those selected from the group consisting of polyalkyleneglycol fatty acid diesters, fatty acid polyalkylene glycol monoether esters, dicarboxylic acid bis(polyalkyleneglycol monoether)esters, fatty acid alkyl esters, polyglycerol fatty acid esters, silicone oils, alkylvinyl ethers, higher hydrocarbons, potassium salts of fatty acids, and polyhydric alcohol-fatty acid esters. The separating agent is incorporated in the ink composition preferably in an amount of from 0.5 to 15% by weight, more preferably from 1 to 10% by weight based on the weight of the ink composition. It is used in the form of solution or emulsion in an aqueous medium.

If necessary, the ink composition may further comprise an auxiliary for emulsifying or solubilizing the foregoing separating agent in the aqueous medium, a surface active agent for enhancing the wetting properties of the ink with respect to the surface of a writing board or a lower alcohol for expediting the drying of writing, such as ethanol and propanol, in a small amount.

The aqueous marking pen ink composition for writing board according to the present invention can be obtained, for example, by a process which comprises mixing a dispersion of colored fine grains (microcapsule) prepared by the foregoing known microcapsulation method, a separately prepared aqueous resin solution and a required amount of water, subjecting the resulting mixture to stirring by a disper for about 1 hour, adding a separating agent and optionally other additives to the mixture, and then further stirring the mixture for about 1 hour. The resulting aqueous marking pen ink composition for writing board can be filled into various types of marking pens for practical use.

For the marking pen to which the ink composition of the present invention is applicable, a pen-tip made of a bundle of fibers bound with a resin is generally used.

Examples of the marking pens include a marking pen which has an ink reservoir made of a bundle of fibers and ink impregnated therein, a marking pen which has a cylindrical barrel with a closed bottom at one end of the barrel, ink directly filled in the barrel, and a pen-tip at the other end of the barrel, wherein a valve is provided between the barrel and the pen-tip, a marking pen which has a cylindrical barrel, ink directly filled in the barrel, a pen-tip fixed at the tip end of the barrel, and ink-supplying mechanism provided at the rear end of the barrel, wherein ink is supplied by knocking operation of the ink-supplying mechanism, and the like.

The present invention will be further described in the following examples, but the present invention should not be construed as being limited thereto.

EXAMPLES 1–10 AND COMPARATIVE EXAMPLES 1-2

1) Preparation of a Dispersion of Colored Fine Grains (Microcapsule)

(1) Dispersion of Red-Colored Fine Grains 5 g of a red solvent dye (C. I. solvent red 49: Rhodamine B Base, available from Toaka Chemical Co,. Ltd.) and 22.5 g of isocetyl isostearate were dissolved in 30 g of methyl ethyl ketone. To the solution thus obtained was then added 10 g of Colonate L (polyvalent isocyanate available from Nippon Polyurethane Industry Co., Ltd.). The mixture was then subjected to homogeneous mixing under heating. The mixture was then subjected to emulsification by a homomixer in 50 g of a 5% aqueous solution of polyvinyl alcohol which had been heated to a temperature of about 70° C. in such a manner that microdroplets having a size of from 0.5 to 1.0 $\mu$m were formed with stirring. Subsequently, the emulsion thus obtained was heated to a temperature of 80° C. where it was then stirred for about 3 hours to cause methyl ethyl ketone as a volatile solvent to evaporate away. Thus, a dispersion of red-colored fine grains (microcapsule) having the foregoing solvent dye/isocetyl isostearate solution incorporated therein was obtained.

The fine grains thus obtained had an average diameter of 1.5 $\mu$m.

(2) Dispersion of Black-Colored Fine Grains A 20 g of a black solvent dye (C. I. solvent black 27: Valifast Black 3820, available from Orient Chemical Industries, Ltd.) was dissolved in 60 g of methyl ethyl ketone. To the solution thus obtained was then added 10 g of an epoxy resin (bisphenol A/diglycidyl ether-based epoxy resin; epoxy equivalent: 184–194). The mixture was then subjected to homogeneous mixing under heating. The mixture was then subjected to emulsification by a homomixer in 50 g of a 5% aqueous solution of polyvinyl alcohol which had been heated to a temperature of about 70° C. so that microdroplets having a size of from 0.5 to 1.5 $\mu$m were formed. To the emulsion thus obtained was then added dropwise a solution of 2.5 g of an epoxy resin hardener (aliphatic polyamine) in 22.5 g of water in about 1 hour with stirring. Subsequently, the solution was heated to a temperature of 80° C. where it was then stirred for about 5 hours to cause methyl ethyl ketone to evaporate away. Thus, a dispersion of black-colored fine grains having the foregoing black solvent dye incorporated therein was obtained.

The black fine grains in the dispersion thus obtained had an average diameter of 1.0 $\mu$m.

(3) Dispersion of Black-Colored Fine Grains B 10 g of a carbon black preparation (Microlith Black C-K, available from Ciba Geigy Ltd.) which had been surface-treated with a vinyl chloride/vinyl acetate copolymer resin and 10 g of cetyl 2-ethylhexanate were dispersed/dissolved in 50 g of methyl ethyl ketone. To the carbon black dispersion thus obtained was then added 10 g of Colonate L (polyvalent isocyanate available from Nippon Polyurethane Industry Co., Ltd.). The mixture was then subjected to homogeneous mixing under heating. The mixture was then subjected to emulsification by a homomixer in 60 g of a 5% aqueous solution of polyvinyl alcohol which had been heated to a temperature of about 70° C. in such a manner that microdroplets having a size of from 0.5 to 1.0 $\mu$m were formed. To the emulsion thus obtained was then added dropwise a solution of 1 g of diethylenetriamine in 24 g of water in about 30 minutes with stirring to cause methyl ethyl ketone to evaporate away. Thus, a dispersion of black-colored fine grains having the foregoing carbon black/cetyl 2-ethylhexanate incorporated therein was obtained.

The black fine grains in the dispersion thus obtained had an average diameter of 1.0 $\mu$m.

(4) Dispersion of Yellow-Colored Fine Grains 10 g of a yellow solvent dye (Valifast Yellow 1109, available from Orient Chemical Industries, Ltd.) and 15 g of cetyl 2-ethylhexanate were dissolved in 40 g of methyl ethyl ketone. To the solution thus obtained was then added 10 g of Colonate L (as described above). The mixture was then subjected to homogeneous mixing under heating. The mixture was then subjected to emulsification by a homomixer in 60 g of a 5% aqueous solution of polyvinyl alcohol which had been heated to a temperature of about 70° C. in such a manner that microdroplets having a size of from 0.5 to 1.0 $\mu$m were formed. The emulsion thus obtained was heated to a temperature of 80° C. where it was then stirred for about 3 hours. Thus, a dispersion of yellow-colored fine grains having the foregoing dye/cetyl 2-ethylhexanate incorporated therein was obtained.

The yellow fine grains in the dispersion thus obtained had an average diameter of 1.0 $\mu$m.

(5) Dispersion of Blue-Colored Fine Grains 10 g of an indanthrene blue pigment preparation (Microlith Blue A3R-K, available from Ciba Geigy Ltd.) and 10 g of di-2-ethylhexyl adipate were dispersed/dissolved in 50 g of methyl ethyl ketone. To the dispersion thus obtained was then added 10 g of Colonate L (polyvalent isocyanate available from Nippon Polyurethane Industry Co., Ltd.). The mixture was then subjected to homogeneous mixing under heating. The mixture was then subjected to emulsification by a homomixer in 80 g of a 5% aqueous solution of polyvinyl alcohol which had been heated to a temperature of about 70° C. in such a manner that microdroplets having a size of from 0.5 to 1.0 μm were formed with stirring. Subsequently, the emulsion thus obtained was heated to a temperature of 80° C. where it was then stirred for about 5 hours to cause methyl ethyl ketone as a volatile solvent to evaporate away. Thus, a dispersion of blue-colored fine grains having the foregoing indanthrene blue/di-2-ethylhexyl adipate dispersion incorporated therein was obtained.

The fine grains thus obtained had an average diameter of 1.0 μm.

(6) Dispersion of Green-Colored Fine Grains 15 g of a phthalocyanine green pigment preparation which had been surface-treated with vinyl chloride/vinyl acetate copolymer resin (Fuji IK Green, available from Fuji Shikiso K.K.) and 5 g of butyl stearate were dissolved in 40 g of methyl ethyl ketone. To the solution thus obtained was then added 10 g of an epoxy resin (bisphenol A/diglycidyl ether-based epoxy resin; epoxy equivalent: 184–194). The mixture was then subjected to homogeneous mixing under heating. The mixture was then subjected to emulsification by a homomixer in 70 g of a 5% aqueous solution of polyvinyl alcohol which had been heated to a temperature of about 70° C. so that microdroplets having a size of from 0.5 to 1.5 μm were formed. To the emulsion thus obtained was then added dropwise a solution of 5 g of an epoxy resin hardener (aliphatic polyamine) in 35 g of water in about 1 hour with stirring. Subsequently, the solution was heated to a temperature of 80° C. where it was then stirred for about 5 hours to cause methyl ethyl ketone to evaporate away. Thus, a dispersion of green-colored fine grains having the foregoing phthalocyanine green/butyl stearate dispersion incorporated therein was obtained.

The green fine grains in the dispersion thus obtained had an average diameter of 1.0 μm.

2) Examples of Ink and Comparative Examples of Ink

The compositions of Examples of ink according to the present invention prepared from the foregoing various dispersions of colored fine grains and Comparative Examples of ink prepared according to the foregoing process are set forth in Table 1.

The ink of Comparative Example 1 comprised an ordinary pigment as a colorant, and the ink of Comparative Example 2 was prepared according to JP-B-8-32845.

TABLE 1

| Raw Material | | Example | | | | | | | | | | Comparative Example | |
|---|---|---|---|---|---|---|---|---|---|---|---|---|---|
| | | 1 | 2 | 3 | 4 | 5 | 6 | 7 | 8 | 9 | 10 | 1 | 2 |
| Dispersion of colored grains | | | | | | | | | | | | | |
| Dispersion of red-colored grains | | 15 | | | | 15 | | | | | | | |
| Dispersion of black-colored grains A | | | 20 | | | | 20 | | | | | | |
| Dispersion of black-colored grains B | | | | 15 | | | | 20 | | | | | |
| Dispersion of yellow-colored grains | | | | | 20 | | | | 20 | | | | |
| Dispersion of blue-colored grains | | | | | | | | | | 25 | | | |
| Dispersion of green-colored grains | | | | | | | | | | | 20 | | |
| Dispersion of red pigment | (1) | | | | | | | | | | | 20 | |
| Dispersion of red pigment | (2) | | | | | | | | | | | | 7.4 |
| Resin | | | | | | | | | | | | | |
| Resin solution | (3) | 20 | | 20 | 15 | 20 | 20 | | | 20 | 15 | 20 | 15 |
| Resin solution | (4) | | 6 | | | | | | | | | | |
| Resin | (5) | | | | | | | 2 | 2 | | | | |
| Separating agent | | | | | | | | | | | | | |
| Emulsion of separating agent | (6) | 20 | 20 | | | | | | | | | 20 | |
| Emulsion of separating agent | (7) | | | 15 | 15 | | | | | | | | |
| Polyether-modified silicone oil | (8) | | | | | 5 | | | | | | | |
| Emulsion of separating agent | (9) | | | | | | | 20 | | | | | |
| Emulsion of separating agent | (10) | | | | | | | | 20 | | | | |
| Emulsion of separating agent | (11) | | | | | | | | | 20 | | | |
| Emulsion of separating agent | (12) | | | | | | | | | | 20 | | |
| Potassium salt of aliphatic acid | (13) | | | | | | 7 | | | | | | |
| Other additives | | | | | | | | | | | | | |
| Surface active agent | (14) | 1 | 1 | | | | 1 | 1 | 1 | 1 | 1 | 1 | |
| Surface active agent | (15) | | | | | | | | | | | | 2.5 |
| Silica dispersion | (16) | | | | | | | | | | | | 35 |
| Silicone emulsion | (17) | | | | | | | | | | | | 6.5 |
| Water | | 43 | 52 | 49 | 49 | 59 | 52 | 57 | 57 | 34 | 44 | 38 | 33.6 |

The raw materials set forth in the table above will be further described along with the parenthesized figure.

(1) Aqueous pigment dispersion containing 8% by weight of an azo-based red pigment and 5% by weight of a polyvinyl alcohol
(2) Aqueous red pigment dispersion (Lactimine color scarlet FL-G, available from DAINICHISEIKA COLOR & CHEMICALS MFG. CO., LTD.)
(3) 10% Aqueous solution of polyvinyl alcohol (GOHSENOL GL-05, available from The Nippon Synthetic Chemical Industry Co., Ltd.; saponification degree: 78.5 to 81.5 mol-%; polymerization degree: 500)
(4) 25% Polyvinyl acetal solution (S-LEC KW-10, available from Sekisui Chemical Co., Ltd.)
(5) Hydroxypropylcellulose (HPC-L, available from Nippon Soda Co., Ltd.)

(6) Emulsion of ethylene glycol monobutyl ether ester stearate (concentration: 30%)
(7) Emulsion of cetyl 2-ethylhexanate (concentration: 30%)
(8) Polyether-modified silicone oil (SILWET L-7607, available from Nippon Unicar Company Limited, yellowish brown liquid)
(9) Alkylvinyl ether emulsion (RIKAVINYTHER C, available from New Japan Chemical Co., Ltd.; concentration: 30%)
(10) Pentaerythiritol tetraisooctanate emulsion (PENTARA N-408, available from Nikko Chemicals Co., Ltd.; concentration:: 30%)
(11) Liquid paraffin emulsion (WHITEREX 309, available from Mobil Sekiyu K.K.; concentration: 30%)
(12) 2-Octyldodecanol emulsion (EUTANOL G, available from Henkel Hakusui Corporation; concentration: 30%)
(13) Potassium oleate (FR-14, available from Kao Corporation)
(14) Polyoxyethylene alkyl aryl ether phosphoric acid ester (PLYSURF A-210G, available from Dai-ichi Kogyo Seiyaku Co., Ltd.; HLB: 9.6)
(15) Polyether-modified silicone oil (L-7600, available from Nippon Unicar Company Limited)
(16) Aqueous dispersion of hydrophobic silica (AEROSIL R-972, available from Nippon Aerosil K. K.; concentration: 30%)
(17) Dimethyl silicone oil emulsion (LE-45, available from Nippon Unicar Company Limited; concentration: 35%)

3) Test for Properties (Erasability of Writing) of Ink Sample

The various ink samples were each put into a marking pen comprising a pen-tip made of a bundle of fibers bound with a resin and an ink reservoir made of a bundle of fibers in a predetermined amount to prepare pen samples.

A predetermined line was drawn with the various pen samples on a writing board coated with a thermosetting acryl/silicone resin (coated board) and an enamelled writing board. These ink samples were then each examined for erasability of writing half-dried and after dried.

To erase writing, a dried cloth was used. In some detail, writing was wiped with the dried cloth under a load of 100 g. The number of wiping required until writing is completely erased was determined.

The results of the test are set forth in Table 2.

The erasability of writing was evaluated in accordance with the following criterion:

○: Erased by 5 or less times of wiping

Δ: Erased by 6 to 10 times of wiping x: Stain occur on the surface of the writing board; not erased even by 10 times of wiping The aqueous marking pen ink composition for writing board according to the present invention is a water-based ink. Therefore, the aqueous marking pen ink composition for writing board according to the present invention emits no nasty odor during use and exhibits a high safety as compared with volatile organic solvent-based ink. While the conventional aqueous ink is disadvantageous in that writing drawn therewith dries slowly and thus cannot be fairly erased when wiped in a half-dried condition, causing stain on the surface of the writing board, the aqueous marking pen ink composition for writing board according to the present invention is not liable to such a problem. Accordingly, the aqueous marking pen ink composition for writing board according to the present invention can give writing that can be fairly erased regardless of whether it is shortly after drawn on the writing board or after thoroughly dried.

While the invention has been described in detail and with reference to specific embodiments thereof, it will be apparent to one skilled in the art that various changes and modifications can be made therein without departing from the spirit and scope thereof.

This application is based on Japanese patent application Hei-9-52490, filed on Feb. 19, 1997, incorporated herein by reference.

What is claimed is:

1. An aqueous marking pen ink composition for writing board, which comprises a colorant, a resin, a separating agent and water, wherein said colorant comprises microcapsules containing a coloring substance selected from the group consisting of an oil-soluble dye, a disperse dye and a pigment, said microcapsules further containing an oil medium in which said coloring substance is dissolved or dispersed, and said microcapsules are dispersed in an aqueous medium.

2. The aqueous marking pen ink composition for writing board according to claim 1, wherein said oil medium is one member or a mixture of two or more members selected from the group consisting of esters, aromatic hydrocarbons, higher alcohols, ketones and ethers.

TABLE 2

| Test | Example Nos. | | | | | | | | | | Comparative Example Nos. | |
|---|---|---|---|---|---|---|---|---|---|---|---|---|
| | 1 | 2 | 3 | 4 | 5 | 6 | 7 | 8 | 9 | 10 | 1 | 2 |
| Erasability of half-dried writing | | | | | | | | | | | | |
| Coated writing board | ○ | ○ | ○ | ○ | ○ | ○ | ○ | ○ | ○ | ○ | x | Δ |
| Enamelled writing board | ○ | ○ | ○ | ○ | ○ | ○ | ○ | ○ | ○ | ○ | x | x |
| Erasability of completely dried writing | | | | | | | | | | | | |
| Coated writing board | ○ | ○ | ○ | ○ | ○ | ○ | ○ | ○ | ○ | ○ | ○ | Δ |
| Enamelled writing board | ○ | ○ | ○ | ○ | ○ | ○ | ○ | ○ | ○ | ○ | ○ | Δ |

3. The aqueous marking pen ink composition for writing board according to claim 2, wherein said esters are monobasic esters, dibasic monoesters, dibasic diesters, partial esterification products of polyvalent alcohols and complete esterification products of polyvalent alcohols.

4. The aqueous marking pen ink composition for writing board according to claim 2, wherein said aromatic hydrocarbons are alkylbenzenes and alkylnaphthalenes.

5. The aqueous marking pen ink composition for writing board according to claim 1, wherein said microcapsules are colored fine grains having an average diameter of from 0.1 to 10 μm.

6. The aqueous marking pen ink composition for writing board according to claim 1, wherein said microcapsules are incorporated in an amount of from 2 to 30% by weight based on the total weight of the ink composition.

7. The aqueous marking pen ink composition for writing board according to claim 1, wherein said separating agent is a compound selected from the group consisting of polyalkyleneglycol fatty acid diesters, fatty acid polyalkylene glycol monoether esters, dicarboxylic acid bis (polyalkyleneglycolmonoether)esters, fatty acid alkylesters, polyglycerol fatty acid esters, silicone oils, alkylvinyl ethers, higher hydrocarbons, potassium salts of fatty acids, and polyhydric alcohol-fatty acid esters.

8. The aqueous marking pen ink composition for writing board according to claim 1, wherein said separating agent is incorporated in an amount of from 0.5 to 15% by weight based on the total weight of the ink composition.

9. The aqueous marking pen ink composition for writing board according to claim 1, wherein said separating agent is dissolved or emulsified in said aqueous medium.

10. The aqueous marking pen ink composition for writing board according to claim 1, wherein said resin is selected from the group consisting of partially saponified polyvinyl acetates, polyvinyl acetals, polyvinyl alcohols, vinyl acetate/vinyl alcohol/acrylic acid ester copolymers, vinyl acetate/vinyl alcohol/methacrylic acid ester copolymers, and cellulose resins.

11. The aqueous marking pen ink composition for writing board according to claim 1, wherein said resin is incorporated in an amount of from 0.1 to 15% by weight based on the total weight of the ink composition.

* * * * *